United States Patent Office 3,342,897
Patented Sept. 19, 1967

3,342,897
BLENDS OF THE POLYPYROMELLITAMIDE OF BIS(4-AMINOPHENYL) ETHER AND POLYPYROMELLITAMIDE-ACID OF AN AROMATIC DIAMINE
John G. Abramo, Wilmington, Del., assignor to E. I. du Pont de Nemours and Company, Wilmington, Del., a corporation of Delaware
No Drawing. Filed Dec. 9, 1964, Ser. No. 417,242
21 Claims. (Cl. 260—857)

This invention relates to polymeric compositions and their preparation. More particularly, this invention is directed to blends of the polypyromellitimide of bis-(4-aminophenyl) ether and one or more polypyromellitimides of other aromatic diamines.

It often is desirable to make copolymers or blends of polymers, either to enhance certain properties or reduce cost. Copolyimides which can be prepared readily do not show the desired high level of physical properties. Hence, it was desired to make blends but this could not be done prior to the invention described herein because of the intractability of most aromatic polyimides.

The compositions of this invention are blends of the polypyromellitimide of bis(4-aminophenyl) ether with about 5–35 mole percent, based on the total amount of polypyromellitimides present, of one or more polypyromellitimides of another aromatic diamine.

Thus, one essential component of the compositions of this invention is the polypyromellitimide of bis(4-aminophenyl) ether. The second essential component is at least one polypyromellitimide which is different from the first component and which is a polypyromellitimide of an aromatic diamine having the formula $H_2N\text{—}R^1\text{—}NH_2$ where $R^1$ is a divalent aromatic radical (arylene), preferably one of the following groups: phenylene, naphthylene, biphenylene, anthrylene, furylene, benzfurylene and

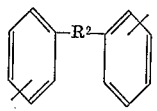

where $R^2$ is alkylene of 1–3 carbon atoms, sulfur, or one of the following:

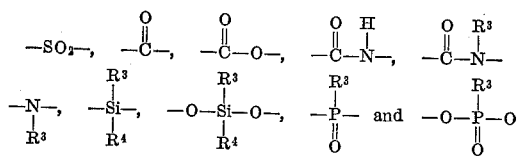

wherein $R^3$ and $R^4$ are alkyl or aryl, and substituted groups thereof.

Illustrative of preferred polyimides useful as the second essential polymer component of the blend compositions of the present invention are those derived from diamines in the following group: meta-phenylene diamine; para-phenylene diamine; 2,2-bis(4-aminophenyl)propane; 4,4'-diaminodiphenyl methane; 4,4'-diaminodiphenyl sulfide; 4,4'-diaminodiphenyl sulfone; 3,3'-diaminodiphenyl sulfone; 2,6-diaminopyridine; bis(4-aminophenyl)diethyl silane; bis(4-aminophenyl)diphenyl silane; benzidine; 3,3'-dichlorobenzidine; 3,3'-dimethoxybenzidine; bis(4-aminophenyl)ethyl phosphine oxide; 4,4'-diaminobenzophenone; bis(4-aminophenyl)phenyl phosphine oxide; bis(4-aminophenyl)-N-butylamine; bis(4-aminophenyl)-N-methylamine; 1,5-diaminonaphthalene; 3,3'-dimethyl-4,4'-diaminodiphenyl; N-(3-aminophenyl)-4-amino-benzamide; 4-aminophenyl-3-amino-benzoate; bis(4-aminophenyl)-N-phenylamine; and mixtures thereof.

In the practice of the present invention, the individual polyamide-acid corresponding to the first essential component, i.e. the polyamide-acid of pyromellitic acid and bis(4-aminophenyl) ether, and the individual polyamide-acid corresponding to the second essential component, i.e. the polyamide-acid of pyromellitic acid and at least one aromatic diamine other than bis(4-aminophenyl) ether, are separately prepared according to known techniques involving reaction of the selected acid, preferably as the corresponding pyromellitic dianhydride and the diamine or diamines, as described above, in an organic solvent for at least one of the reactants, the solvent being inert to the reactants, preferably under anhydrous conditions, for a time and at a temperature sufficient to provide a composition containing polyamide-acid.

The polypyromellitamide-acid of bis(4-aminophenyl) ether and the other polypyromellitamide-acid are then intimately mixed together at a temperature below room temperature. The resulting blend of polypyromellitamide-acids, having an inherent viscosity of at least 0.1, and preferably 0.3–5.0, is then shaped into a useful article, e.g., film, filament, tube, rod, etc., and then converted to the corresponding polyimides by known techniques such as heat treatment at temperatures above about 50° C., chemical treatment or a combination of both. Suitable procedures are described, for example, in Edwards U.S. patent application Ser. No. 169,120 filed Jan. 26, 1962; Endrey U.S. patent application Ser. No. 169,119 filed Jan. 26, 1962; Endrey U.S. patent application Ser. No. 169,106 filed Jan. 26, 1962; Hendrix U.S. patent application Ser. No. 169,108 filed Jan. 26, 1962; and Edwards and Endrey U.S. patent application Ser. No. 236,721 filed Nov. 9, 1962.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity the viscosity of the polymer solution is measured relative to that of the solvent alone.

$$\text{Inherent viscosity} = \frac{\text{natural logarithm } \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The preferred diamines for use in preparation of the polypyromellitamide-acids to be blended with the polypyromellitamide-acid of bis(4-aminophenyl) ether are m-phenylene diamine, p-phenylene diamine, benzidine, bis(4-aminophenyl) sulfone and bis(4-aminophenyl) sulfide. Any of the other aromatic diamines mentioned in the above-identified patent applications, as well as in Edwards U.S. patent application Ser. No. 95,014 filed Mar. 13, 1961, are also suitable.

The temperature of mixing of the polyamide-acids to form the blends of this invention is dependent on several factors. Among these are the viscosity of the polymer solutions and the efficiency of mixing. Temperatures approaching room temperature can be tolerated if mixing is accomplished in a few minutes. For solutions of the composition generally used for film casting, a one-hour mixing at 0° C. is satisfactory.

The polyimide blends produced by this invention have considerably higher moduli and tensile strengths than copolymers of the same approximate chemical compositions. This superiority is apparent even at 200° C. There is very little, if any, sacrifice of other important properties such as impact, tear and zero strengths.

Modulus is a measure of film stiffness, that is, the higher the modulus the greater the stiffness, and the modulus as used herein is the slope of the initial portion of the stress/strain curve at 1% elongation, the film being elongated at a rate of 5% per minute or less.

Tenacity or tensile strength as used herein is based upon the cross-sectional area of the film being measured and is determined by elongating a film sample at a rate of 5% per minute or less until the film sample breaks.

Impact strength as used herein is the energy required to rupture a film. It is reported in kilograms-centimeters per mil of thickness of the film sample. Impact strength is determined by measuring the velocity of a ball mechanically accelerated by air pressure, first in free flight and then in flight immediately after being impeded by rupturing the test film sample. In this test the film sample is 1¾ inch by 1¾ inch. The projectiles are steel balls one-half inch in diameter and weighing 8.3 grams. The free flight ball velocity is 40±2 meters per second. The velocities are measured by timing photoelectrically the passage of the steel balls between two light beams set a definite distance apart. The impact strength is measured by the loss in kinetic energy of the ball due to the rupturing of the film sample. It is calculated from the following formula:

Constant X (square of velocity in free flight—
square of velocity in impeded flight)

where the constant is directly proportional to the weight of the projectile and inversely proportional to the acceleration due to gravity.

Tear strength as used herein is measured on an Elmendorf tear tester. A film is cut to form sample strips of 2.5 inches by 5.0 inches each. Ten such strips from each direction, i.e. ten having the longer dimension running in the machine or longitudinal direction which is the direction in which the film was extruded, cast or calendered and ten having the longer dimension running in a direction transverse to the machine direction, are conditioned and tested at 75° F. and 35% relative humidity. The tester consists of a stationary jaw and a movable jaw mounted on a pendulum swinging on a substantially frictionless bearing equipped with a means for measuring the maximum arc through which the pendulum will swing. After the sample has been clamped in the tester, an initial cut of 0.81 inch running in the intended direction of the subsequent tear is made by means of a blade mounted on the tester. The force required to extend the initial tear is measured by determining the work done in tearing the film through a given distance which is 2.0 inches. The work is determined from the difference in the swing of the pendulum, first free and then impeded by tearing the film. Auxiliary weights can be added to the pendulum when the tear strength of a single sheet of film exceeds the capacity of the pendulum alone. The scale of the Elmendorf tester, a standard instrument of the industry, reads in terms of grams per 2.0 inches of tear per 16 sheets. Since 10 sheets are used in the tests referred to herein, the values obtained were corrected and then converted to grams per inch of tear per mil of film thickness.

The invention will be more clearly understood by referring to the examples which follow. These examples, which illustrate specific embodiments of the present invention, should not be construed to limit the invention in any way.

*Example 1*

A 15% by weight solution of the polypyromellitamide-acid of bis(4-aminophenyl) ether in N,N-dimethylacetamide is chilled to 0° C. and mixed with a 15% by weight solution in N,N-dimethylacetamide of the polypyromellitamide-acid of m-phenylenediamine, also at 0° C., the amount of the second solution being such that the molar ratio of the second polymer to the first is 25/75. After being stirred for 1 hour at 0° C., the combined solution is cast into a film. This gel film is immersed in a pyridine/acetic anhydride bath (2.4/1 mixture by volume) to convert the polyamide-acids to the corresponding polyimides. The film of blended polyimides has the physical properties indicated below. For comparison purposes, a film was similarly made using a copolymer (rather than a blend) of approximately the same chemical composition and found to have the physical properties as indicated below:

| | Blend Film | Copolymer Film |
|---|---|---|
| Modulus: | | |
| 23° C., p.s.i. | 450,000 | 359,000 |
| 200° C., p.s.i. | 298,000 | 241,000 |
| Tensile strength: | | |
| 23° C., p.s.i. | 12,000 | 12,000 |
| 200° C., p.s.i. | 9,000 | 4,000 |
| Impact strength, kg.-cm./mil. | 2.3 | |
| Tear strength, g./in./mil. | 8.3 | |
| Zero strength temperature, °C. | 875 | 745 |

*Examples 2–8*

By the procedure of Example 1, blends of the polypyromellitimide of bis(4-aminophenyl) ether containing 7, 13 and 29 mole percent of the pyromellitimide of p-phenylene diamine, 5, 12 and 25 mole percent of the polypyromellitimide of benzidine and 25 mole percent of the polypyromellitimide of bis(4-aminophenyl) sulfone were prepared. Their moduli are indicated below, compared with the moduli of films similarly made using a copolymer (rather than a blend) of approximately the same chemical compositions respectively:

| Example No. | Diamine | Modulus (In thousand p.s.i.) | |
|---|---|---|---|
| | | 23° C. | 200 °C. |
| 2 | 7% p-phenylene diamine | 446 | 295 |
| 3 | 13% p-phenylene diamine | 464 | 337 |
| 4 | 29% p-phenylene diamine | 619 (¹494) | 481 (¹314) |
| 5 | 5% benzidine | 541 | 328 |
| 6 | 12% benzidine | 524 | 387 |
| 7 | 25% benzidine | 691 (¹512) | 488 (¹380) |
| 8 | 25% bis(4-aminophenyl) sulfone | 472 (¹344) | 288 (¹190) |

¹ Value for copolyimide of approximately same chemical composition

In additional tests it was observed that the blend film of Example 8 has a higher moduli, both room temperature and hot (200° C.), than either the homopolypyromellitimide of bis(4-aminophenyl) ether or the homopolypyromellitimide of bis(4-aminophenyl) sulfone.

The foregoing examples can be repeated, as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. An intimate blend of the polypyromellitamide-acid of bis(4-aminophenyl) ether and the polypyromellitamide-acid of an aromatic diamine, the latter said polypyromellitamide-acid constituting from about 5 to 35 mole percent of the total amount of polypyromellitamide-acids present, said aromatic diamine having the formula $$H_2N—R^1—NH_2$$

where $R^1$ is a divalent aromatic radical selected from the group consisting of phenylene, naphthylene, biphenylene, anthrylene, furylene, benzfurylene and

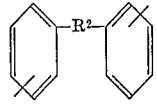

where $R^2$ is selected from the group consisting of alkylene of 1–3 carbons, sulfur,

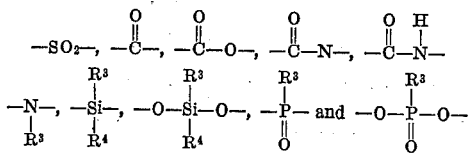

where $R^3$ and $R^4$ are each selected from the group consisting of alkyl and aryl.

2. A shaped article of an intimate blend of claim 1.
3. A self-supporting film of an intimate blend of claim 1.
4. A filament of an intimate blend of claim 1.
5. An intimate blend of the polypyromellitamide-acid of bis(4-aminophenyl) ether and the polypyromellitamide-acid of m-phenylene diamine, the latter constituting from about 5 to 35 mole percent of the total amount of polypyromellitamide-acids present.
6. An intimate blend of the polypyromellitamide-acid of bis(4-aminophenyl) ether and the polypyromellitamide-acid of p-phenylene diamine, the latter constituting from about 5 to 35 mole percent of the total amount of polypyromellitamide-acids present.
7. An intimate blend of the polypyromellitamide-acid of bis(4-aminophenyl) ether and the polypyromellitamide-acid of benzidine, the latter constituting from about 5 to 35 mole percent of the total amount of polypyromellitamide-acids present.
8. An intimate blend of the polypyromellitamide-acid of bis(4-aminophenyl) ether and the polypyromellitamide-acid of bis(4-aminophenyl) sulfone, the latter constituting from about 5 to 35 mole percent of the total amount of polypyromellitamide-acids present.
9. An intimate blend of the polypyromellitamide-acid of bis(4-aminophenyl) ether and the polypyromellitamide-acid of bis(4-aminophenyl) sulfide, the latter constituting from about 5 to 35 mole percent of the total amount of polypyromellitamide-acids present.
10. An intimate blend of the polypyromellitimide of bis(4-aminophenyl) ether and the polypyromellitimide of an aromatic diamine, said latter polypyromellitimide constituting from about 5 to 35 mole percent of the total amount of polypyromellitimides present, said aromatic diamine having the formula $H_2N-R^1-NH_2$ where $R^1$ is a divalent aromatic radical selected from the group consisting of phenylene, naphthylene, biphenylene, anthrylene, furylene, benzfurylene and

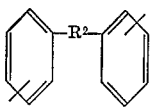

where $R^2$ is selected from the group consisting of alkylene of 1–3 carbons, sulfur,

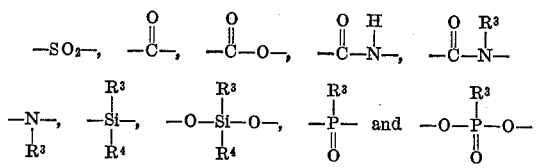

where $R^3$ and $R^4$ are each selected from the group consisting of alkyl and aryl.

11. A shaped article of an intimate blend of claim 10.
12. A self-supporting film of an intimate blend of claim 10.
13. A filament of an intimate blend of claim 10.
14. An intimate blend of the polypyromellitimide of bis(4-aminophenyl) ether and the polypyromellitimide of m-phenylene diamine, the latter constituting from about 5 to 35 mole percent of the total amount of polypyromellitimides present.
15. An intimate blend of the polypyromellitimide of bis(4-aminophenyl) ether and the polypyromellitimide of p-phenylene diamine, the latter constituting from about 5 to 35 mole percent of the total amount of polypyromellitimides present.
16. An intimate blend of the polypyromellitimide of bis(4-aminophenyl) ether and the polypyromellitimide of benzidine, the latter constituting from about 5 to 35 mole percent of the total amount of polypyromellitimides present.
17. An intimate blend of the polypyromellitimide of bis(4-aminophenyl) ether and the polypyromellitimide of bis(4-aminophenyl) sulfone, the latter constituting from about 5 to 35 mole percent of the total amount of polypyromellitimides present.
18. An intimate blend of the polypyromellitimide of bis(4-aminophenyl) ether and the polypyromellitimide of bis(4-aminophenyl) sulfide, the latter constituting from about 5 to 35 mole percent of the total amount of polypyromellitimides present.
19. The process comprising admixing, at a temperature below room temperature and for a time sufficient to form an intimate blend, the polypyromellitamide-acid of bis-(4-aminophenyl) ether and the polypyromellitamide-acid of an aromatic diamine having the formula $$H_2N-R^1-NH_2$$

where $R^1$ is a divalent aromatic radical selected from the group consisting of phenylene, naphthylene, biphenylene, anthrylene, furylene, benzfurylene and

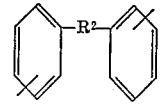

where $R^2$ is selected from the group consisting of alkylene of 1–3 carbons, sulfur,

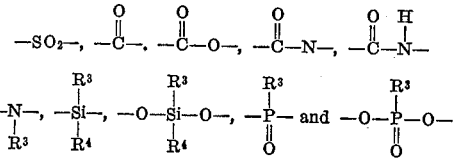

where $R^3$ and $R^4$ are each selected from the group consisting of alkyl and aryl, the latter polypyromellitamide-acid constituting from about 5 to 35 mole percent of the total amount of polypyromellitamide-acids present.

20. A process according to claim 19 including the step of converting said polypyromellitamide-acids therein to the corresponding polypyromellitimides.
21. The process comprising admixing, at a temperature below room temperature and for a time sufficient to form an intimate blend, the polypyromellitamide-acid of bis-(4-aminophenyl) ether and the polypyromellitamide-acid of an aromatic diamine having the formula $$H_2N-R^1-NH_2$$

where $R^1$ is a divalent aromatic radical selected from the group consisting of phenylene, naphthylene, biphenylene, anthrylene, furylene, benzfurylene and

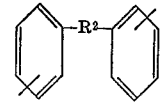

where $R^2$ is selected from the group consisting of alkylene of 1–3 carbons, sulfur,

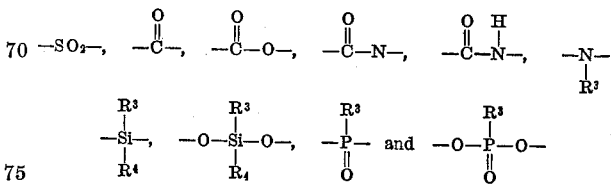

where $R^3$ and $R^4$ are each selected from the group consisting of alkyl and aryl, the latter polypyromellitamide-acid constituting from about 5 to 35 mole percent of the total amount of polypyromellitamide-acids present, to form a composition having an inherent viscosity of at least 0.1 as measured at 30° C. on a solution of 0.5% by weight in N,N-dimethylacetamide; shaping said composition into a shaped article; and heating said article at a temperature of at least 50° C. for a time sufficient to convert the polypyromellitamide-acids to polyimides.

No references cited.

MURRAY TILLMAN, *Primary Examiner.*

PAUL LIEBERMAN, *Assistant Examiner.*